(No Model.)
F. SALATHÉ.
HYDROCARBON PRODUCT.
No. 564,341. Patented July 21, 1896.
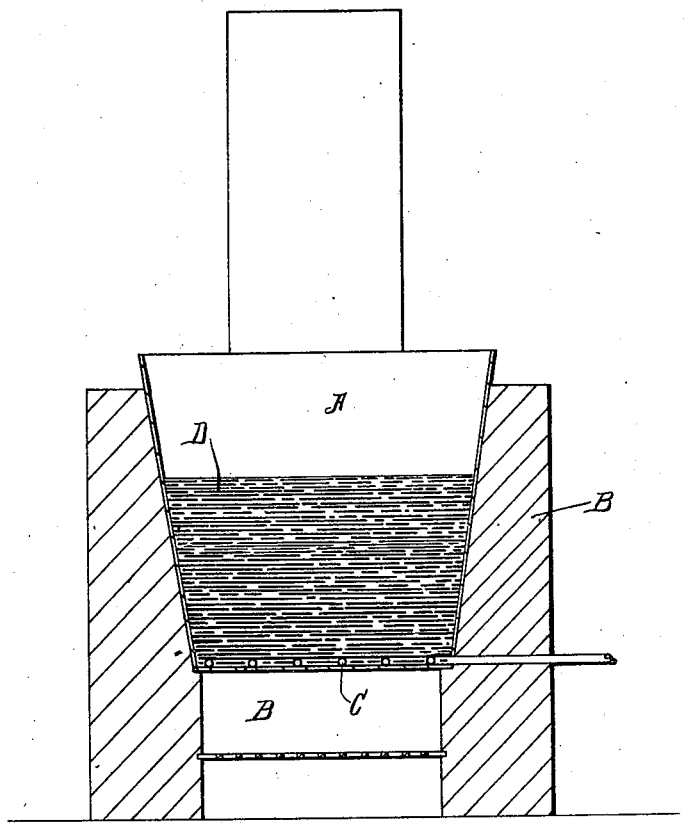
Witnesses.
P. W. Harbeson.
J. F. Peckham
Inventor.
Frederick Salathé
By
Hazard & Townsend,
His Attys.

UNITED STATES PATENT OFFICE.

FREDERICK SALATHÉ, OF SANTA PAULA, CALIFORNIA, ASSIGNOR TO THE UNION OIL COMPANY OF CALIFORNIA, OF SAME PLACE.

HYDROCARBON PRODUCT.

SPECIFICATION forming part of Letters Patent No. 564,341, dated July 21, 1896.

Application filed February 19, 1894. Serial No. 500,720. (No specimens.)

*To all whom it may concern:*

Be it known that I, FREDERICK SALATHÉ, a citizen of the United States, formerly a resident of Jersey City, and also of New York city, now residing at Santa Paula, in the county of Ventura and State of California, have invented a new and useful Hydrocarbon Product, of which the following is a specification.

The object of my invention is to produce a cheap hydrocarbon product which possesses the property of resisting the action of acids and alkalies and which is a non-conductor of electricity and heat and is impermeable to water and which at ordinary temperatures is hard and devoid of stickiness and will be suitable for various uses and which at high temperatures is very fluid and is peculiarly adapted for being combined with fibrous material for use as insulators and the manufacture of buckets and other utensils, shingles, buttons, &c.

My newly-invented hydrocarbon product is obtained from bitumens convertible into asphaltum. Those which I have used are found in Ventura county, California, in the vicinity of Santa Paula. I have heretofore produced from these bitumens a sulfurized product which is valuable in the arts. The said sulfurized product can be produced by melting the bitumen in an open kettle having a capacity of several times the volume of the bitumen taken, and sulfur in the proportion of from one to ten per cent. by weight of the bitumen taken is added in small quantities at a time. The addition of the sulfur is accompanied by copious evolution of sulfureted-hydrogen gas, which would, if the sulfur were all added at one time, cause the mixture to froth and boil over. The mixture is stirred to facilitate the escape of the gas until all the sulfur has been added. It is then heated for from one to two hours until this escape of sulfureted hydrogen ceases. The resultant sulfurized product is distinct from my present product, as hereinafter more fully set forth.

My new product is defined as a conjugated oxy compound of bitumen and oxygen having a melting-point lying between 200° and 300° Fahrenheit, such melting-point depending upon the melting-point of the asphaltum or bituminous residuum from which it is prepared. It is a substance differing physically from asphalt and other bitumens, from which it is formed, and from the product obtained by treating said bitumens with sulfur in that, in certain menstrua, the present product herein described is less soluble than said sulfurized product and the different varieties of asphaltum or other bitumens from which the sulfurized product or the present product may have been respectively formed. Among these menstrua may be mentioned the different alcohols, including amylic alcohol, and the different petroleum naphthas obtained from either Pennsylvania or California petroleums.

Benzol and bisulfid of carbon, being universal solvents for bitumens, freely dissolve all the forms of the herein-described product.

In common with the sulfurized product, the present product differs chemically from asphaltum and other bitumens from which it is formed in that, whereas, under oxidation by concentrated nitric acid, said asphaltum and bitumens produce oxalic and carbonic acids and leave a gummy mass as a residue, the present product under oxidation by concentrated nitric acid produces nitro products together with an organic acid which is identified with styphnic acid, which is trinitrodioxybenzol. The product of the action of nitric acid upon the said asphaltum and bitumens has been closely investigated by me, and the presence of oxalic acid and carbonic acid was clearly distinguished by the following method: The aqueous liquor from the nitrification was first evaporated, so as to eliminate the excess of nitric acid, then taken up with distilled water, neutralized with ammonia hydrate, and then by the addition of calcic chlorid, oxalate of calcium was precipitated and determined as such. The carbonic acid was determined by passing the gas during the nitrification and afterward through a deoxidizing solution into a standard solution of sodium hydrate and determined as barium carbonate. The nitro products which I have obtained from this new product are not so distinctly crystalline as those obtained from a like quantity of the sulfurized product. Such product oxidized by nitric acid or other oxidizing agents will yield a solution which when treated by chlorid of barium, will yield the well-known white precipitate of barium sulfate. The present product, when thus treated, will not produce this reaction. Each variety of the present product formed invariably has a higher specific gravity and a higher melting-point than the corresponding sulfurized product or the asphalt or other form of bitumen from which the herein-described product may be formed.

The accompanying drawing illustrates apparatus suitable for producing oxypetrocarbon.

A indicates a kettle, B indicates a furnace for heating the same, and C indicates a perforated air-pipe for introducing air into the kettle containing the bitumen treated, which is indicated by D.

The method of manufacturing the present product is described as follows: Any one of the asphalts or asphaltic residuums which are obtained in the distillation of bitumens that are convertible into asphaltum may be used as a crude material from which this product may be made. Having selected the particular bitumen or residuum desired, it is melted in an open kettle having a capacity of several times the volume of the bitumen taken and while in a fluid condition is subjected to the action of a current of air which is forced through it. If air alone is used, it must be constantly forced through the melted bitumen for several hours in order to complete the operation. This long process may be rendered unnecessary by the addition of active oxidizing agents, such, for instance, as the oxids or peroxids of lead, or binoxids of manganese, peroxid of hydrogen, peroxid of sodium, or other well-known oxidizing agents. The time required for the proper oxidation of the bitumen will depend upon the activity of the agent used. The amount of oxid of lead or any other similar oxidizing agent required for the purpose will also depend upon the degree of hardness required in the particular product being prepared. I have used to best advantage two pounds of peroxid of manganese or two and one-half pounds of oxid of lead per forty-two gallons of asphalt for its conversion into this product; but these quantities may be slightly varied according to the plasticity or hardness of the product required. It is found that in the use of oxid of lead the oxygen will be absorbed by the bitumen, and the lead will be precipitated in the vessel as metallic lead. In some of its physical properties this product resembles the sulfurized product. Like that, it is more fluid when melted than the bitumen from which it is formed. When cold, it has lost the stickiness which characterized the said bitumen and has become brilliant and black, possessing more toughness than the corresponding sulfurized product and like that possessing the property of resisting the action of acids and alkalies unless the solutions are concentrated.

My present product is notably distinguished from the product set forth in Letters Patent No. 452,764, patented to me May 19, 1891, in that this product is harder at normal temperatures and contains a well-defined and comparatively large percentage—viz., 2.3 per cent.—of oxygen, while the said patented product contains only traces of oxygen. Furthermore its physical property differs from the said patented product in that it is highly sensitive to the rays of sunlight when spread in solution upon a plate, while said patented product is not sensitive to sunlight. Furthermore the patented product does not, under oxidation by concentrated nitric acid, produce nitro products together with styphnic acid, (trinitrodioxybenzol,) but it furnishes terebinic acid and terephtalic acid and is clearly defined in said Letters Patent as belonging to the terpene series, while this product is devoid of any member of the terpene series. The elementary combustion analysis of this present product is as follows: carbon, 86.80 per cent.; hydrogen, 10.80 per cent.; oxygen, 2.30 per cent.; nitrogen, traces.

The bitumen for which this material is made should be a hard brittle bitumen free from all impurities, and the product is characterized by being hard and devoid of stickiness at ordinary temperatures, while at high temperatures, say from 300° to 350° Fahrenheit, its penetrating qualities are more marked than that of the bitumen from which it is made or of the corresponding sulfurized product made from such bitumen at the same temperature. This peculiarity makes this new product especially valuable for saturation of woody fibers for the manufacture of the articles above mentioned.

Now, having described my invention, what I claim as new, and desire to secure by Letters Patent, is—

The new composition of matter set forth consisting of a conjugated oxy compound of bitumen and oxygen, having a melting-point lying between 200° and 300° Fahrenheit, which has a higher specific gravity and a higher melting-point and is less soluble in amylic alcohol and petroleum naphthas and which, when melted, is more penetrating for saturating woody fiber than the bitumen from which it is formed and also than the corresponding sulfurized product, when in like condition and which under oxidation by concentrated nitric acid produces nitro products together with an organic acid identified with styphnic acid.

FREDERICK SALATHÉ.

Witnesses:
STEPHEN F. PECKHAM,
JAMES R. TOWNSEND.